United States Patent
Burke et al.

(10) Patent No.: US 6,319,996 B1
(45) Date of Patent: Nov. 20, 2001

(54) POLYMERIZATION PROCESS USING A DUAL SHEAR MIXING ELEMENT

(75) Inventors: Annette Lynn Burke; Edward Christopher Foy; John Iatrou; Umesh Karnik, all of Calgary; Darwin Edward Kiel, New Westminster; Vaclav George Zboril, Calgary, all of (CA)

(73) Assignee: Nova Chemical (International) S.A. (CH)

( * ) Notice: Subject to any disclaimer, the term of this patent is extended or adjusted under 35 U.S.C. 154(b) by 0 days.

(21) Appl. No.: 09/439,268

(22) Filed: Nov. 12, 1999

Related U.S. Application Data

(62) Division of application No. 09/048,945, filed on Mar. 26, 1998, now Pat. No. 6,024,483.

(30) Foreign Application Priority Data

Mar. 27, 1997 (CA) .................................................. 2.201.224

(51) Int. Cl.$^7$ ....................................................... C08F 2/04

(52) U.S. Cl. .................................. 526/64; 526/65; 526/88; 526/348.2; 366/279; 366/319

(58) Field of Search ................................... 526/88, 348.2, 526/64, 65; 366/279, 319

(56) References Cited

U.S. PATENT DOCUMENTS

| | | | |
|---|---|---|---|
| 4,914,168 | * | 4/1990 | Coosemans et al. .......... 526/348.2 X |
| 5,120,805 | * | 6/1992 | Woodson et al. ....................... 526/88 |
| 5,767,208 | * | 6/1998 | Turner et al. .................. 526/348.2 X |

* cited by examiner

*Primary Examiner*—Fred Teskin
(74) *Attorney, Agent, or Firm*—Kenneth H. Johnson

(57) ABSTRACT

A dual shear mixing element for use in a chemical reactor. The device may be used in processes where liquids of different temperatures need to be thoroughly mixed in a short period of time and solute must stay in solution. The present invention is particularly useful in the solution polymerization of polyolefins, especially in the medium pressure process for the preparation of linear low density polyethylene.

5 Claims, 2 Drawing Sheets

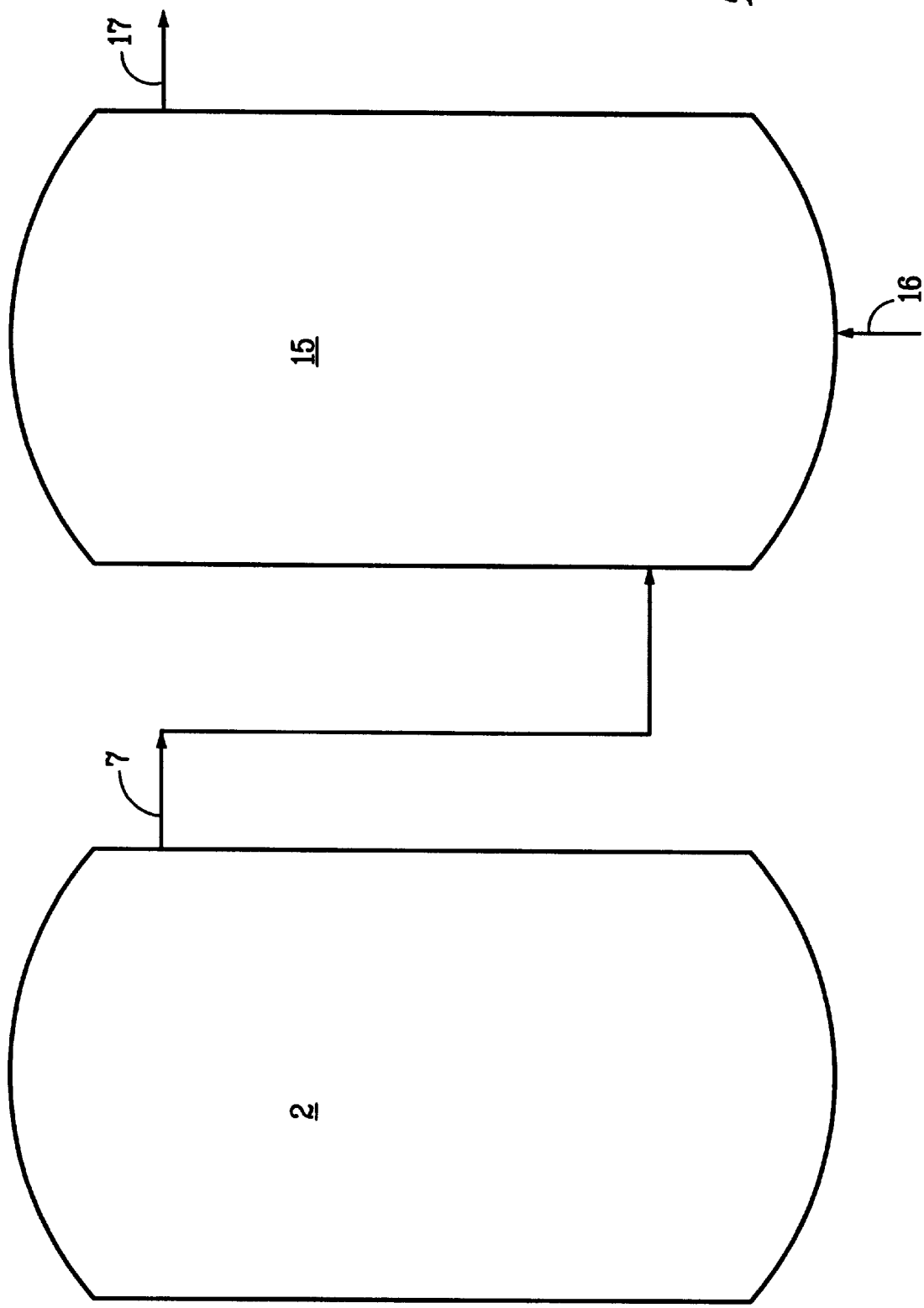

POLYMERIZATION PROCESS USING A DUAL SHEAR MIXING ELEMENT

This application is a division of Ser. No. 09/048,945, filed Mar. 26, 1998 now U.S. Pat. No. 6,024,483.

FIELD OF THE INVENTION

The present invention relates to a dual shear mixing element. The mixing element may be used in chemical reactors where liquids of different temperatures need to be thoroughly mixed in a short period of time and solute must stay substantially in solution. The present invention is particularly useful in the solution polymerization of polyolefins.

BACKGROUND OF THE INVENTION

There are a number of chemical reaction processes in which a relatively cooler stream of liquid is introduced into a relatively warmer solution. One of the concerns relating to such processes is the precipitation of solute from the warmer solution. One way to minimize this problem is to provide for rapid mixing of the solutions typically using some type of high intensity shear device such as a paddle or agitator stirrer. Generally, as the concentration of solute increases the solution often becomes more viscous and/or non-Newtonian and the rapid mixing of the relatively cooler solution and warm solution becomes more difficult. The problem is accentuated if the residence time in the reactor is relatively short. Further difficulties arise if the solute is difficult to re-dissolve in the solvent. This may lead to the formation of precipitate within the reactor which may ultimately affect the product. This problem is particularly acute where the process is constrained by heat or enthalpy transfer considerations.

All of the above issues are particularly relevant to bulk, mass, and solution polymerizations (as opposed to emulsion and suspension in which the diluent is usually water and heat of reaction is not a significant problem) in which there is a need to manage the heat of polymerization from a reactor. For some polymerizations this has led to the use of "chains" of reactors with the reactants being heated to successively higher temperatures and successively higher conversion in different reactors. In general, if the residence time in a reactor is relatively long (e.g. in the order of hours) and where the mixing time is relatively short (e.g. in the order of tens of minutes) there may not be too significant a problem.

In the continuous solution polymerization of olefins there are several problems. The residence time in the reactor is typically short and the lifetime of the catalyst at higher temperatures is also relatively short. Accordingly it is necessary to thoroughly, and quickly, mix the bulk reactor contents with the catalyst and reactor feed streams. After the catalyst is heated to the operating temperature of the reactor it has a short half life. The situation becomes worse where the viscosity of the solution rises (most notably when a high concentration of polymer is employed or when cooler conditions are used to make higher molecular weight polymer).

There have been several approaches to this problem. One approach has been to use tubular reactors. The high surface area of tube or loop reactors assist in the removal of heat of reaction. In order to avoid problems of precipitation, the reactor feed streams should be at temperatures above the precipitation temperature of the polymer from the solvent. However higher reactor temperature may also lead to the undesirable formation of low molecular weight polymer. Thus there are usually temperature limitations which restrict the operating flexibility of a tube or loop reactor.

U.S. Pat. No. 4,282,339 issued Aug. 4, 1981, assigned to National Distillers and Chemical Corp., teaches a process for the high pressure polymerization of alpha olefins in which dual autoclaves are used in tandem. The first reactor is a relatively higher pressure reactor (e.g. 30,000 psi). The product from the first reactor is cooled while still under high pressure and then introduced into a second reactor at a relatively lower pressure (e.g. 22,000 psi) and the polymerization is finished. The reference does not teach medium pressure polymerizations or suggest the type of mixing element of the present invention.

U.S. Pat. No. 4,496,698, issued Jan. 29, 1985, assigned to The Dow Chemical Company, takes a similar approach to the high pressure polymerization of ethylene in which the first reactor is operated at pressures of greater than 50,000 kilo Pascals ("kPa") (about 7,500 psi) and then the polymer melt is cooled and fed through a cooling heat exchanger to a second reactor which may be a tube or loop reactor. The reference does not teach medium pressure polymerization or suggest the type of mixing element of the present invention.

The paper *Circulation Time Prediction in the Scale-up of Polymerization Reactors with Helical ribbon Agitators* by D. F. Ryan, L. P. B. M. Janssen, and L. L. van Dierendonck, Chemical Engineering Science, Vol. 43, No. 8, pp. 1961–1966, 1988 illustrates a chemical reactor (which may be used for polymerization) having a helical ribbon agitator but does not suggest a mixing element in accordance with the present invention.

The present invention seeks to provide a mixing element useful for rapid mixing of relatively cooler and warmer solutions, preferably in which the solvent is a hydrocarbon, to reduce the potential of solute precipitation.

SUMMARY OF THE INVENTION

The present invention provides a mixing element for a chemical reactor comprising in cooperating arrangement:
  a. a tube which defines an open interior space, said tube having a cylindrical top section, a flared bottom section, and a fixed stator between said top section and said bottom section, wherein said fixed stator partially constricts said open interior space in the area between said cylindrical top section and said flared bottom section;
  b. a combined auger and impeller comprising:
    b1. a central shaft rotatable within said tube;
    b2. at least one auger flight integrally attached to said central shaft so as to describe a helix about said central shaft, wherein said auger flight is located within, and rotatable within, said open space of said cylindrical top section of said tube; and
    b3. a series of impeller blades attached to said shaft below said fixer stator and said at least one auger flight at a distance sufficient to permit clearance between said fixed stator and said at least one auger flight, wherein said impeller blades are located within, and rotatable within, said open space within said flared bottom section of said tube, with the proviso that the rotation diameter of said impeller blades is greater than the rotation diameter of said at least one auger flight.

The present invention further provides a reactor comprising a closed cylindrical vessel having one or more inlets, one or more outlets, a ratio of height to diameter from 1.5:1 to 5:1 and internally a mixing element as described above, preferably having a height from 0.75 to 0.90 the internal height of the reactor, at least one of said one or more inlets being located in the bottom of said closed cylindrical vessel and the flared portion of said mixing element being proximate said at least one inlet.

The present invention further provides a process for mixing a cooler liquid having a temperature from 20 to 200° C. into a hotter and more viscous solution having a temperature from 110 to 300° C. said cooler liquid having a temperature of at least 20° C. cooler than said solution, comprising introducing said relatively cooler liquid into the above reactor, through said inlet proximate to said flared portion of said tube and rotating the central shaft of said mixing element at a speed sufficient to provide turbulent mixing within the flared bottom section of the tube.

In a preferred embodiment of the present invention the relatively warmer solution comprises a solution of ethylene, polyethylene and a solvent (preferably organic solvent), and the relatively cooler solution comprises catalyst, activator, solvent and monomer(s).

BRIEF DESCRIPTION OF THE DRAWINGS

FIG. 2 is a schematic view of a polymerization process which employs two reactors.

DETAILED DESCRIPTION

Figure 1:
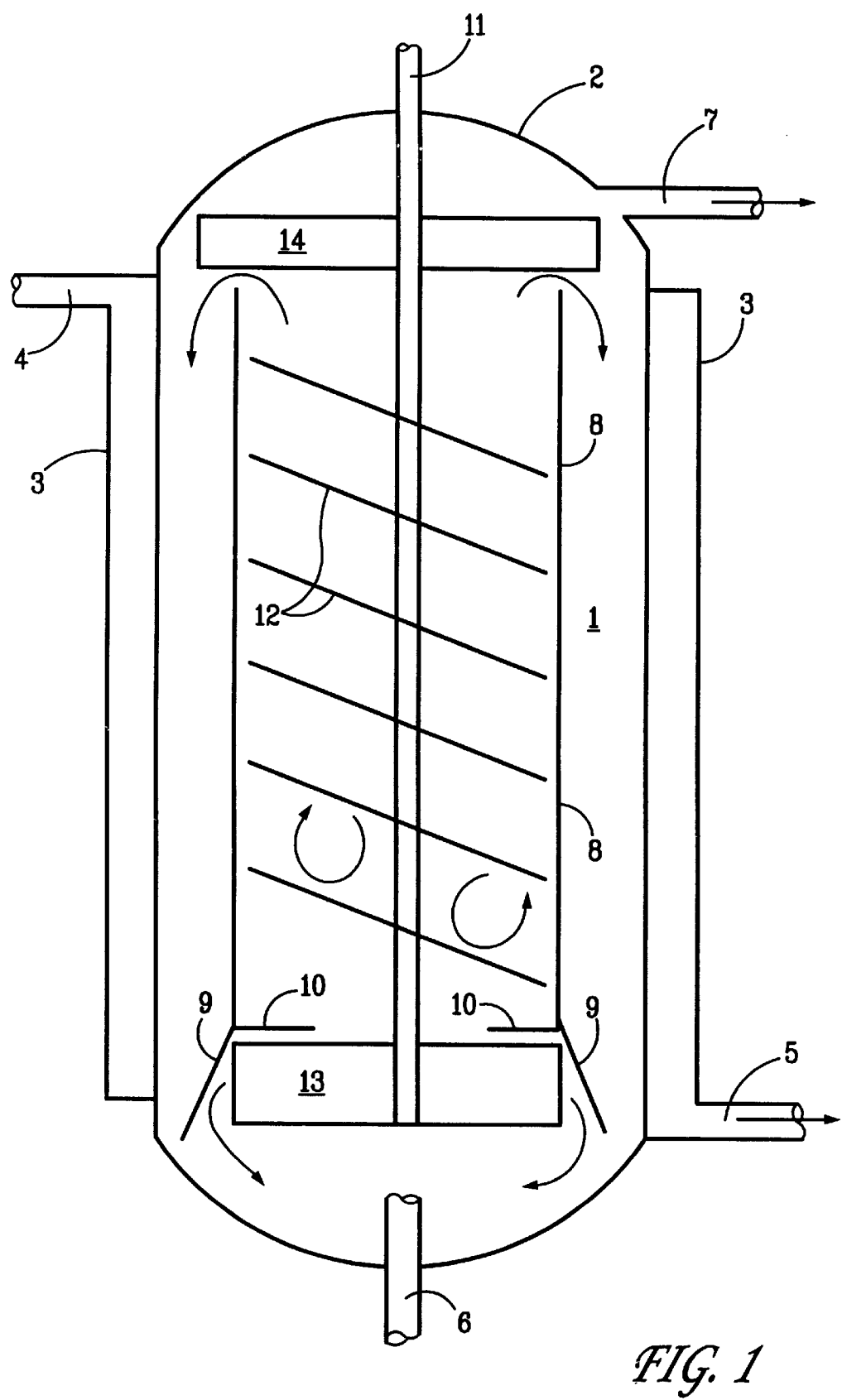
FIG. 1 is a sectional schematic view of a reactor containing a mixing element in accordance with the present invention.

The mixing element of the present invention will be described in conjunction with FIG. 1. While FIG. 1 will be described in the context of the solution polymerization of ethylene, the present invention provides a high shear/low shear mixing apparatus which may be used in any chemical reactor where there is a need of efficient mixing and a concern with temperature gradients within the solution and possible precipitation. The mixing element is most preferably employed in a reactor used for the solution polymerization of ethylene at medium pressure.

In FIG. 1 the mixing element 1 is located in a reactor 2 having an (optional) jacket 3 for heating (or cooling). The jacket has at least one inlet 4 and at least one outlet 5 to allow flow of a heating or cooling medium through the jacket and heat or cool the reactor. The reactor also has an inlet 6 and an outlet 7. The end point of the inlet tube is preferably located near the flared bottom portion 9 of the mixing element. Typically the reactor may have a height to diameter ratio from 1.5:1 to 5:1, preferably from about 1.5:1 to 3:1.

The mixing element includes a continuous tube which has a cylindrical top section 8 and a flared bottom portion 9. The flared portion 9 may be an outwardly beveled portion as shown in FIG. 1 or it may be a "bell" shape. Internally in the continuous tube between the cylindrical portion and the flared or outwardly beveled portion is a fixed stator 10. The stator 10 reduces or constricts the open interior space in a tube cross section taken through the stator. This, in turn, constricts flow through this space. The stator may be of essentially any shape which provides such flow constriction. For convenience, the stator may be a simple orifice plate (i.e. a flat circular plate having a central hole drilled through it). An alternative stator design includes a central ring (with the ring encircling the shaft 11 in a manner which allows shaft rotation), an exterior ring (which is attached to the tube) and "blades" or "shafts" which connect the exterior ring to the interior ring. The "blades" of the stator 10 may be essentially vertical or may have a low pitch (generally less than 5° off vertical). The stator 10 is in close proximity to the impeller blades 13. Thus the mixing which occurs in the flared bottom portion 9 when the impeller blades 13 are rotated is affected by the stator 10 in a manner which generally increases the shear in the flared bottom portion 9.

A central shaft 11 passes through the reactor wall and is powered by a drive means such as an electrical motor (not shown). About the central shaft in the cylindrical portion of the mixing element is an auger flight 12. The central shaft preferably has a root mean diameter from about 0.10 to 0.75, most preferably from about 0.30 to 0.50 of the maximum diameter of the auger flight (i.e. this "maximum diameter" is the diameter of the circle swept out by the auger flight in a single horizontal plane passing through the shaft and is indicated by reference numeral 20 in FIG. 1). An alternate name for this diameter is the rotation diameter. The diameter of the flight is preferably from 0.85 to 0.99 the diameter of the interior space of the cylindrical section 8 (most preferably from 0.95 to 0.99). Thus, as indicated in FIG. 1, the auger flight 12 almost touches the inside wall of the cylindrical top section 8. The flight has a pitch from 0.85 to 1.50 times the diameter of the central shaft. Typically the pitch may be from 15 to 45°, preferably from 30 to 45° off horizontal. The edges of each flight may have a slight rim or bead on the upper surface thereof.

The auger flight 12 is a continuous element and is integrally attached to the central shaft 11 in a manner which describes a helix. Thus the auger flight 12 and central shaft 11 form a component which might be described by those skilled in the art as an Archimedes screw. The use of more than one auger flight is permissible (and it will be appreciated that the use of more than one auger flight will generally reduce bending moments on the shaft, at the expense of an additional power requirement to rotate the shaft).

At the bottom of the central shaft are a series of impeller blades 13. The rotation diameter (indicated by reference numeral 30), or (alternatively stated) the diameter of circle swept out by the impeller blades may be from 0.85 to 0.99 the internal diameter of the flared portion 9 of the tube at their point of closest approach. In the figure the flared portion of the tube is angled from the cylindrical portion in a straight line (in cross section) and the impeller blades are squared (i.e. the view of the impeller blades shows 90° (or "right") angled corners). Accordingly the point of closest approach is at the plane of the upper edge of the impeller blades. However, the impeller blades need not be squared. They could have the same degree of bevel as the flared portion of the tube or they could have some other suitable shape (e.g. "bell"). It is highly preferred that there is turbulent mixing (i.e. meaning a Reynolds number of at least 500) in the flared portion of the tube. The impeller blades may be vertical (i.e. having two edges parallel to the axis of rotation of the shaft) or pitched up to 45° off vertical.

In a particularly preferred embodiment a second series of impeller blades 14 may be attached to the central shaft above the cylindrical portion of the continuous tube. The diameter of the circumference swept out by the second series of impeller blades may be from 0.9 to 1.3, preferably about 0.9 to 1.2 times the interior diameter of the cylindrical portion of the continuous tube. As with the impeller blades 13 in the flared portion, the second set of impeller blades 14 may be vertical or may have a pitch from about 30 to 45° off vertical.

In operation the reactor may be used in the solution polymerization of ethylene. In the medium pressure solution polymerization of polyethylene the pressure is less than 5,000 psi (about 35,000 kPa) and is preferably from about 2,000 to 3,000 psi (about 14,000–23,000 kPa). The monomers, typically from about 35 to 100 weight % of ethylene and 0 to 65 weight % of one or more $C_{4-10}$ alpha olefins such as 1-butene, 1-hexene, and 1-octene are dissolved in solvent (typically a $C_{5-8}$ aliphatic solvent), and fed to a reactor. (Other monomers which are copolymerizable with ethylene—such as vinyl aromatics (e.g. styrene), butadiene and norbornene, may also optionally be used.) The reactor is typically operated at temperatures from 110 to 300° C. A portion of the feed, together with the catalyst (generally comprising a Ziegler Natta catalyst, or a single site/homogeneous catalyst such as a metallocene), and an activator (which activator is typically an aluminum compound, or an alumoxane, or a "weakly coordinating anion" (e.g. $B(C_6F_5)_3^-$ or a $B(C_6F_5)_4$ complex such as $[CPh_3][B(C_6F_5)_4]$), may be fed to the reactor at a cooler temperature than the temperature reactor contents. The reactor contents are relatively more viscous than the cooler feed (due to the presence of dissolved polyethylene) and generally do not form a Newtonian fluid. Typically, the reactor contents comprise a solution from about 3 to 20% of polyethylene in solvent.

The cooler liquid feed enters the reactor proximate the flared portion 9 of the continuous tube and is directed towards the impeller blades in the flared portion 9 of the continuous tube. The large rotation diameter of the impeller blades 13 produces a high shear zone within the confines of the flared bottom portion 9. The relatively cooler liquid is rapidly mixed with the relatively warmer liquid in the higher shear zone at the bottom of the mixing element. The high shear provides for intimate mixing of fresh catalyst with the bulk solution of reactants to provide for high rates of polymerization. Further, the cooler solution cools the reaction mixture. However, the mixing is such that there is essentially no precipitation of polymer from the solution. In the high shear mixing zone within the flared portion 9, some of the reactants are directed downward as indicated by the arrows in FIG. 1. This material is then redirected upwards into the zone of high shear mixing by the re-circulation within the reactor. Some of the liquid passes by the stator 10 at the bottom of the cylindrical portion 8 of the tube and is drawn upward by the rotating auger flight on the central shaft. The shear rate in this portion of the mixing element is lower than that in the flared portion of the mixing element and the contents within a section of the auger tends to roll over upon itself. This is indicated by the arrow 16 at the bottom of the auger. Again this provides for good mixing within the continuous tube. Material is moved up the tube, then overflows outside the tube where a portion is withdrawn as a product stream while the remainder generally circulates through the reactor and into the flared bottom portion 9 of the tube again.

The amount of product drawn off from the reactor through exit port 7 is balanced against the total feed to define an average residence time in the reactor. The average residence time in a medium pressure reactor should be in the order of minutes (e.g. less than 20 minutes, preferably less than 10, most preferably in the order of 0.5–8 minutes). Average residence time may be quickly determined by dividing the volumetric flow through the reactor (cubic meters per minute) by the volume of the reactor (cubic meters).

The material drawn from the reactor may be passed on to a subsequent reactor (which may also have a mixing element of the present invention) or it may be treated to separate the polymer from the solvent and "finishing" it into a final product by way of unit operations which are well known to skilled engineers and technicians familiar with the art.

It is highly preferred that the central shaft of the mixing element will be operated at speeds sufficient to provide turbulent mixing (as defined by a Reynolds number of at least 500) in the flared bottom portion 3. The term Reynolds number is meant to convey its conventional meaning, namely a dimensionless parameter defined by the formula:

$$\text{Reynolds number} = \frac{\rho n D^2}{\mu}$$

where $\rho$—density, $\mu/m^3$

D—impeller diameter, m $\mu$—dynamic viscosity, Pas n—rotational speed, rps

However, the useful and optimum speed of rotation will to some extent be a function of the design of the mixing element and may be optimized by non-inventive routine testing.

Although the invention has been described in terms of the manufacture of solution polyethylene it is useful in reactions in which relatively cooler solutions are mixed with a relatively warmer solution and there is a concern about premature precipitation from solution.

The present invention will now be demonstrated by the following non-limiting examples in which, unless otherwise indicated, "parts" means parts by weight (e.g. grams) and "%" means weight per cent.

EXAMPLE

This example illustrates the continuous flow, solution (co-)polymerization of ethylene at a medium pressure using a two reactor system. The first reactor operates at a relatively low temperature. The contents from the first reactor flow into the second reactor.

The first reactor had a volume of 12 liters and was equipped with an inventive mixing element as schematically illustrated in FIG. 1. The inventive mixing element included an auger flight and central shaft (parts 12 and 11, respectively in FIG. 1), a tube which enclosed the auger flight (and contains a cylindrical top section 8 and flared bottom portion 9), a series of impeller blades 13 which rotate about the central shaft 11 within the flared portion of the tube 9, a stator 10 to restrict flow between the flared bottom section 9 and the cylindrical section 8 of the tube, and a series of impeller blades 14 above the top of the cylindrical portion 8 of the tube.

The above described mixing element was contained within a polymerization reactor having an inlet port 6 and exit port 7.

Monomers, solvent and catalyst were fed into the reactor as indicated in Table 1. The solvent used in these experiments was methyl pentane.

As indicated in FIG. 2, the contents of the first reactor were discharged through the exit port 7 into a second reactor 15 having a volume of 24 liters. The second reactor 15 was equipped with a conventional impeller agitator, an inlet port 16 (for additional monomer, solvent and/or catalyst feed) and a discharge port 17.

The first reactor 1 was equipped with thermowells (temperature measuring devices) at 11 different locations. In spite of the very large temperature difference between the feed temperature and reactor temperature in the first reactor, these thermowells generally showed a temperature difference of less than 3° C. (i.e. the difference between the highest and lowest reading amongst the 11 devices was typically less than 3° C.). This clearly indicates that the reactor is extremely well mixed. This is highly desirable as it is known to those skilled in the art that non-uniform mixing can produce temperature and/or monomer concentration gradient which, in turn, leads to a lack of polymer homogeneity (which lack of polymer homogeneity results in broad molecular weight distribution and/or non-uniform comonomer distribution).

Furthermore, poor reactor mixing can cause the polymer to precipitate from solution which, in turn, leads to unstable reactor operation and/or sever reactor fouling. The problem of polymer precipitation is particularly difficult when cold feed temperatures and/or high ratios of feed:reactor volume are employed. All of the experiments reported in Table 1 produced stable reactor operation, despite the very severe conditions which are described. In particular, a temperature difference between the inlet temperature and reactor temperature as high as 121° C. is shown in Table 1. [By way of comparison, unstable reactor conditions are typically encountered in a similar reactor having a volume of 3–8 liters and a conventional impeller agitator when the temperature difference between the reactor feed and the bulk reactor is as little as 20° C.]

Table 1 provides data which illustrate ethylene homopolymerization; ethylene copolymerization with octene and "split" reactor feeds (i.e. in which the flow into the second hot reactor includes both of (a) the discharge from cold reactor 1; and (b) additional monomer and solvent, in the amounts shown).

The catalyst employed in all experiments was one known to those skilled in the art as a "Ziegler Natta" catalyst and consisted of titanium tetrachloride ($TiCl_4$), dibutyl magnesium (DBM), and tertiary butyl chloride (TBC), with an aluminum activator consisting of triethyl aluminum (TEAL) and diethyl aluminum ethoxide (DEAO). The molar ratio of the components was:

TBC:DBM (2–2.2:1);

DEAO:$TiCl_4$ (1.5–2:1); and

TEAL:$TiCl_4$ (1–1.3:1).

All catalyst components were mixed in methyl pentane. The mixing order was DBM, TEAL (5:1 molar ratio) and TBC; followed by $TiCl_4$; followed by DEAO. The catalyst was pumped into the reactor together with the methyl pentane. The catalyst flow rate was adjusted to maintain total ethylene conversions above 70%.

Product properties of the resulting polyethylene are also shown in Table 1.

TABLE 1

| | Run | | | | | | | | |
|---|---|---|---|---|---|---|---|---|---|
| | 1 | 3 | 4 | 5 | 6 | 7 | 8 | 9 | 10 |
| Reactor 1 | | | | | | | | | |
| Solvent Flow (kg/h) | 286.7 | 284.1 | 286.3 | 287.5 | 287.9 | 288.5 | 282.3 | 284.7 | 279.5 |
| Ethylene Flow (kg/h) | 15.6 | 19.1 | 17.4 | 20.0 | 19.6 | 19.8 | 18.2 | 18.7 | 26.5 |
| Octene Flow (kg/h) | 0 | 0 | 0 | 0 | 0 | 0 | 9.1 | 15.0 | 15.2 |
| Inlet Temperature (° C.) | 130 | 110 | 100 | 99 | 90 | 80 | 81 | 81 | 80 |
| Average Reactor Temperature (° C)[1] | 174 | 168 | 160 | 167 | 161 | 155 | 149 | 146 | 161 |
| Δ Temperature (° C.)[2] | 44 | 58 | 60 | 68 | 71 | 75 | 78 | 75 | 81 |
| Reactor 2 | | | | | | | | | |
| Solvent Flow (kg/h) | 82.2 | 80.8 | 206.2 | 202.4 | 189.0 | 185.1 | 189.1 | 192.3 | 216.3 |
| Ethylene Flow (kg/h) | 15.9 | 17.4 | 17.9 | 20.3 | 20.2 | 19.9 | 19.8 | 20.1 | 15.3 |
| Octene Flow (kg/h) | 0 | 0 | 0 | 0 | 0 | 0 | 0 | 0 | 0 |
| Inlet Temperature (° C.) | 184 | 173 | 160 | 160 | 163 | 153 | 153 | 153 | 162 |
| Average Reactor Temperature (° C.) | 197 | 200 | 184 | 190 | 200 | 197 | 181 | 180 | 180 |
| Catalyst (ppm)[3] | 6.5–8.0 | 6.5–8.0 | 6.5–8.0 | 6.5–8.0 | 5.5–6.3 | 5.5–6.3 | 5.5–6.3 | 5.5–6.3 | 5.5–6.3 |
| MI[4] | 6.77 | 21.6 | 5.65 | 4.57 | 10.8 | 56.8 | 12 | 6.2 | 4.19 |
| SEx[5] | 1.34 | 1.3 | 1.34 | 1.32 | 1.28 | 1.25 | 1.27 | 1.29 | 1.32 |
| Density (g/cm³) | | | | | 0.9555 | 0.9612 | 0.9299 | 0.9207 | 0.9221 |
| CO/HO[6] | | | | | | | | | |

| | Run | | | | | | | | |
|---|---|---|---|---|---|---|---|---|---|
| | 11 | 12 | 13 | 14 | 15 | 16 | 17 | 18 | 19 | 20 |
| Reactor 1 | | | | | | | | | |
| Solvent Flow (kg/h) | 286.8 | 281.9 | 278.8 | 281.9 | 414.5 | 401.0 | 302.2 | 273.8 | 274.0 | 335.8 |
| Ethylene Flow (kg/h) | 26.0 | 29.8 | 30.1 | 35.0 | 46.0 | 45.1 | 35.0 | 25.0 | 24.9 | 35.1 |
| Octene Flow (kg/h) | 21.0 | 16.4 | 20.2 | 24.3 | 18.6 | 18.0 | 17.2 | 4.6 | 4.5 | 29.3 |
| Inlet Temperature (° C.) | 65 | 65 | 50 | 29 | 30 | 30 | 21 | 37 | 40 | 21 |
| Average Reactor Temperature (° C.)[1] | 151 | 165 | 155 | 153 | 143 | 142 | 133 | 135 | 130 | 132 |
| Δ Temperature (° C.)[2] | 86 | 100 | 105 | 124 | 113 | 112 | 112 | 98 | 90 | 121 |
| Reactor 2 | | | | | | | | | |
| Solvent Flow (kg/h) | 199.2 | 235.7 | 207.3 | 202.3 | 196.2 | 209.2 | 241.2 | 260.6 | 261.1 | 193.9 |
| Ethylene Flow (kg/h) | 14.7 | 15.1 | 14.3 | 14.5 | 18.7 | 19.3 | 65.6 | 75.2 | 75.2 | 59.1 |
| Octene Flow (kg/h) | 0 | 0 | 0 | 0 | 0 | 0 | 19.0 | 12.0 | 12.0 | 50.2 |
| Inlet Temperature (° C.) | 153 | 166 | 158 | 155 | 155 | 155 | 15 | 22 | 21 | 19 |
| Average Reactor Temperature (° C.) | 174 | 182 | 177 | 174 | 169 | 170 | 170 | 184 | 180 | 165 |
| Catalyst (ppm)[3] | 5.5–6.3 | 5.5–6.3 | 5.5–6.3 | 5.5–6.3 | 5.5–6.3 | 5.5–6.3 | 6.6 | 5.5 | 6.38 | 6 |
| MI[4] | 12 | 7.05 | 7.2 | 8.5 | 1.57 | 0.83 | 0.81 | 0.8 | 0.67 | 3.87 |
| SEx[5] | 1.33 | 1.31 | 1.29 | 1.3 | 1.41 | 1.53 | 1.51 | 1.54 | 1.55 | 1.55 |

TABLE 1-continued

| | | | | | | | | | | |
|---|---|---|---|---|---|---|---|---|---|---|
| Density (g/cm³) | 0.9127 | 0.9178 | 0.914 | 0.9162 | 0.9195 | 0.9177 | 0.924 | | 0.9362 | 0.901 |
| CO/HO⁶ | | | | | | 3.1 | 3.7 | 2.4 | 2 | |

Notes:
1. Average of temperature readings from 11 thermowells (i.e. reactor temperature)
2. Difference between "Average" and "Inlet" Temperatures
3. Titanium concentration in reactor
4. Melt Index (ASTM D 1238, condition E)
5. Stress Exponent ($SE_x$)

$SE_x$=Stress Exponent, determined by measuring the flow (expressed as weight, in grams) through a melt index approaches (ASTM D 1238) under two different loads, namely 2160 grams (g) and 6480 g, and the following formula:

$$SE_x = \frac{1}{0.477}\log\frac{\text{(weight extruded under 6480 g load)}}{\text{(weight extruded under 2160 g load)}}$$

6. Ratio of Copolymer to Homopolymer, as determined by Temperature Rising Elution Fractionation or TREF

What is claimed is:

1. A process for mixing a cooler liquid having a temperature from 80 to 200° C. into hotter solution having a temperature from 150 to 300° C. in a reactor comprising a closed cylindrical vessel having A) one or more inlets; B) one or more outlets; C) a ratio of height to diameter from 1.5:1 to 3:1; and D) internally a mixing element comprising in cooperating arrangement:
   a. a tube which defines an open interior space, said tube having a cylindrical top section, a flared bottom section, and a fixed stator between said top section and said bottom section, wherein said fixed stator partially constricts said open interior space in the area between said cylindrical top section and said flared bottom section;
   b. a combined auger and impeller comprising:
      b1. a central shaft rotatable within said tube;
      b2. at least one auger flight integrally attached to said central shaft so as to describe a helix about said central shaft, wherein said auger flight is located within, and rotatable within, said open space of said cylindrical top section of said tube; and
      b3. a series of impeller blades attached to said shaft below said fixer stator and said at least one auger flight at a distance sufficient to permit clearance between said fixed stator and said at least one auger flight, wherein said impeller blades are located within, and rotatable within, said open space within said flared bottom section of said tube, with the proviso that the rotation diameter of said impeller blades is greater than the rotation diameter of said at least one auger flight, said mixing element having a height from 0.75 to 0.90 the internal height of said reactor, at least one of said one or more inlets being located in the bottom of said closed cylindrical vessel and the flared portion of said tube being proximate said at least one inlet;

wherein said cooler liquid has a temperature of at least 20° C. cooler than said solution; said process comprising introducing said relatively cooler liquid into said reactor through said inlet proximate said flared portion of said tube and rotating the central shaft at a speed sufficient to provide turbulent conditions within said flared portion.

2. The process according to claim 1 wherein said cooler liquid is solution comprising solvent, ethylene, catalyst and activator and said hotter solution comprises ethylene, polyethylene and solvent.

3. A process for the solution polymerization of ethylene comprising the reaction of ethylene and a comonomer selected from 1-butene and 1-octene with catalyst and activator in solvent in a polymerization reactor according to claim 1, thereby forming a reaction stream containing dissolved polyethylene, with the provisos that said reactor is operated at a temperature of from 150 to 300° C. and a pressure of from 14,000 to 35,000 kPa.

4. The process according to claim 3 wherein said reaction stream is withdrawn from said reactor and then introduced into a second polymerization reactor.

5. The process according to claim 4 wherein additional amounts of said ethylene, solvent and comonomer are also introduced into said second polymerization reactor.

* * * * *